UNITED STATES PATENT OFFICE.

CHARLES C. PARSONS, OF NEW YORK, N. Y.

IMPROVEMENT IN COMPOSITIONS FOR CRAYONS.

Specification forming part of Letters Patent No. 201,283, dated March 12, 1878; application filed November 9, 1877.

*To all whom it may concern:*

Be it known that I, CHARLES C. PARSONS, of New York city, New York, have invented an Improved Composition for Crayons, of which the following is a specification:

This invention relates to an improved crayon, which may be used for artistic or marking purposes.

The requisite qualities for such a crayon are, that it should possess sufficient hardness and toughness to be carried about freely without danger of breaking, and not to waste away when used upon rough surfaces, while at the same time it should be soft enough to make a full clear mark on smooth or yielding surfaces. The mark made by such a crayon should be adhesive and consistent, so as not to be rubbed off without great difficulty, and it should not be affected by moisture or by any extremes of temperature. No crayons hitherto made possess all these qualities to the extent of those made in the manner invented by me, and herein described. Some have been made of coloring matters, and various mineral substances made into a paste with gums soluble in water. The mark made by such crayons is easily removed by moisture, and even if such crayon is indefinitely soaked in fatty substances, it will thereby only be superficially affected, and the character of the mark will not be improved, as it is absolutely necessary for a perfect crayon that the materials should be perfectly mixed either while all are in a melted state or by grinding, or both.

Crayons made of resins insoluble in water, mineral and coloring matter are hard and brittle, and will not mark except on specially-prepared surfaces. Sealing-wax is just such a composition.

The best results are obtained from a mixture of resinous and fatty matters with mineral substances and coloring matters. There is, however, a very great difference between the action of different mineral matters.

Silicious substances in a crayon render it gritty, so that it marks easily, but wears off too rapidly on rough surfaces, and the mark also rubs off easily. There seems to be no intimate union between the silicious substance and the fatty or resinous substance, but only a mechanical mixture.

Lime or its compounds gives a crayon that will not mark easily on smooth surfaces. The crayon is also hard and brittle. Magnesia and its compounds makes a crayon that marks smoothly and easily; but the mark is affected by moisture, and rubs and becomes easily blurred and indistinct.

The best crayon is made by mixing a powdered clay, free from grit, with hard fatty substance and resin insoluble in water, and with such coloring matter as may be desired. The resin and fat are first mixed together in a melted condition, and the clay and coloring matter are then incorporated by a very thorough mixing, or by first grinding all the materials, and afterward melting, and finally molding.

The alumina in the clay seems to form with the fat and resin compounds analogous to those formed in the fiber of water-proof cloth, which, as is well known, are soft and flexible, but very durable, and entirely unaffected by moisture and change of temperature. Such crayons are tough and hard, but not brittle, and yet mark easily on smooth as well as rough surfaces, and the mark is practically indelible.

I have found excellent results from the following proportions, though I do not limit myself to them. These proportions are, by weight, hard tallow, four parts; resin, one part; powdered clay, one and one-half part; lamp-black, one-half part. Of course, other coloring substances may be substituted for the lamp-black.

I claim—

A crayon composed of clay, fatty matter, resin, and coloring matter, thoroughly mixed by being melted together, substantially as specified.

C. C. PARSONS.

Witnesses:
ERNEST C. WEBB,
F. V. BRIESEN.